United States Patent [19]

Akahori et al.

[11] Patent Number: 4,720,710

[45] Date of Patent: Jan. 19, 1988

[54] PAGING RECEIVER HAVING A PLURALITY OF TEST MODES

[75] Inventors: Masaaki Akahori; Yoshio Ichikawa, both of Tokyo, Japan

[73] Assignee: NEC Corporation, Tokyo, Japan

[21] Appl. No.: 506,131

[22] Filed: Jun. 20, 1983

[30] Foreign Application Priority Data

Jun. 18, 1982 [JP] Japan .................................. 57-104767

[51] Int. Cl.$^4$ ............................................. H04Q 1/00
[52] U.S. Cl. ......................... 340/825.44; 340/825.47; 340/825.48
[58] Field of Search ....................... 340/825.44, 825.04, 340/825.1, 825.39, 825.47, 825.48, 825.71, 311.1; 455/54, 67, 226, 343, 228, 31, 38

[56] References Cited

U.S. PATENT DOCUMENTS

| | | | |
|---|---|---|---|
| 4,353,065 | 10/1982 | Mori | 340/825.44 |
| 4,392,135 | 7/1983 | Ohyagi | 340/825.44 |
| 4,477,807 | 10/1984 | Nakajima et al. | 340/825.44 |
| 4,479,125 | 10/1984 | Mori | 340/825.44 |

FOREIGN PATENT DOCUMENTS

| | | |
|---|---|---|
| 58-129842 | 8/1983 | Japan . |
| 2105077 | 3/1983 | United Kingdom . |
| 2117543 | 10/1983 | United Kingdom . |

OTHER PUBLICATIONS

"A Standard Code for Radiopaging", A Report of the Studies of the British Post Office Code Standardisation Advisory Group, R. H. Tridgell, Chairman, Jul. 1979.

Primary Examiner—Ulysses Weldon
Attorney, Agent, or Firm—Sughrue, Mion, Zinn, Macpeak & Seas

[57] ABSTRACT

A testable pager including a receiver for demodulating a sequence of signals, and a manually operated switch. A controller receives the outputs of the receiver and the switch. The controller thereby switches on a power supply for the receiver for a set period after the start of the signal sequence. When the sequence includes a test code, the power supply stays on and a first test is performed. Actuations of the switch cause further tests to be made.

7 Claims, 9 Drawing Figures

PAGING RECEIVER HAVING A PLURALITY OF TEST MODES

BACKGROUND OF THE INVENTION

The present invention relates to a radio paging receiver and, in particular, to a radio paging receiver which can more efficiently be subjected to various tests or adjustments.

Radio paging receivers are generally provided with a battery saving function to minimize power consumption. The receiver with such a battery saving function intermittently supplies power to its receiving section when the receiver is ready to receive a calling signal addressed thereto. When receivers of this type are subjected to tests or adjustment, the battery saving operation has to be suspended. As used herein an adjustment will be considered as a type of a test.

A portable paging receiver to meet the requirement mentioned above has been described in the U.K. Patent Publication No. 2,105,077 assigned to the present application. The receiver is adapted to suspend the battery saving function temporarily when it receives a specific pattern (test pattern) from the transmitter side. This proposal is limited to the tests on the receiving section.

Another receiver has been proposed which permits the checking of its own assigned address or identification number and the content of read-only memory (ROM) as well as the testing of the display means. This receiver is described in U.S. patent appln. Ser. No. 460,736; U.K. Patent Appln. Ser. No. 8,302,036; and Japanese Patent Appln. No. 82-11415 (corresponding to Japanese Patent Appln. No. 83-129842) assigned also to the present applicant. This receiver responds to a specific signal to continuously display the content of ROM while it responds to another specific signal to display all the numerical numbers and the like which the display section thereof can display.

SUMMARY OF THE INVENTION

Accordingly, an object of the present invention is to provide a paging receiver which improves the abovementioned conventional systems.

Another object of the invention is to provide a paging receiver in which a test can be made not only of its receiving section, its display device and the contents of its ROM (or Programmable-ROM) but also of its receiving sensitivity and any other desired function.

Still another object of the invention is to provide a paging receiver which can prevent deterioration in reliabiity which might otherwise be caused by erroneous reception of a specific test code for the test mode.

Yet another object of the invention is to provide a portable paging receiver which is adapted to minimize power consumption even during the test mode by activating the battery saving function during the tests other than that for the receiving section.

Still another object of the invention is to provide an improved paging receiver which can be switched to a sequence of test modes for a series of tests by receiving a test code from a test encoder and manipulating a reset switch of the receiver.

According to the present invention, there is provided a paging receiver comprising: a receiving section for receiving a carrier wave modulated with a calling signal including a first signal sequence and either a second or a third signal sequence which follows the first signal sequence; a power supply control for supplying power to the receiving section in response to a first control signal; a controller section for supplying the first control signal to the power supply control for a first predetermined time period in response to the detection of the first signal sequence so that the controller section can detect the second or third signal sequence, supplying the first control signal to the power supply control consecutively in order to shift the receiver to a first test mode when the third signal sequence is detected and shifting the receiver from the first test mode to a second test mode in response to a second control signal; and a switch connected to the controller section means for generating the second control signal.

BRIEF DESCRIPTION OF THE DRAWINGS

For a more complete understanding of the features, objects and advantages of the present invention, reference should be made to the attached drawings, in which.

Figure 1:
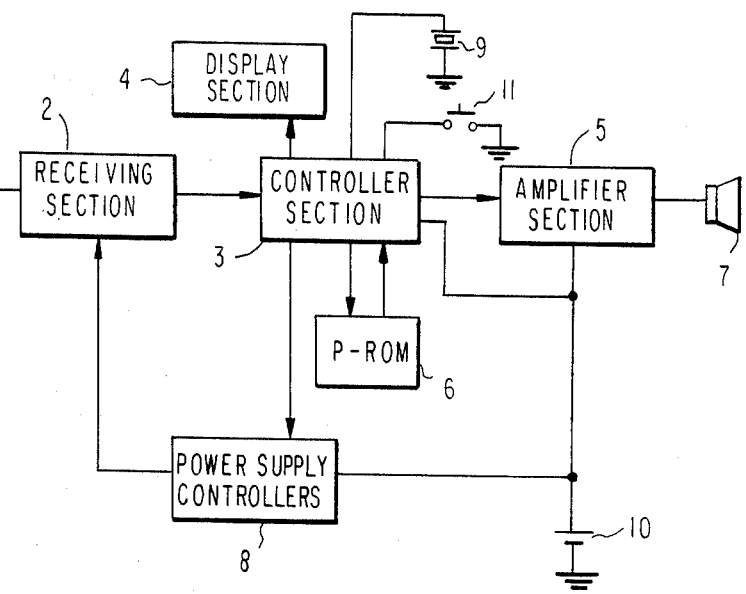
FIG. 1 is a block diagram of an embodiment of the portable radio pager with a display section according to the present invention.

DESCRIPTION OF THE PREFERRED EMBODIMENTS:

In FIG. 1, a receiving section 2 comprises a high frequency circuit, an intermediate frequency circuit, a frequency discriminator circuit and a waveform shaping circuit. The receiving section 2 converts a received carrier wave picked up by an antenna 1 into a digital signal. A controller section 3 is adapted to receive a preamble signal, a frame synchronizing signal, a display information signal and a selective signal. The controller section 3, among other functions, establishes synchronization with the received signal. When the receiver is paged, the controller section 3 generates an alert tone. When the battery voltage of the receiver drops below a predetermined level, the controller section 3 generates an alarm tone. The controller section 3 also generates battery saving timing signals to enable a power supply controller 8 to supply power to the receiving 2 or to stop the supply. The controller section 3 checks errors in the received signal and corrects them in a well-known manner in the art. If the receiver receives the display information signal or is undergoing one of a plurality of test modes, the controller section 3 drives a display section 4 to display the receive display information or information for the test modes. The controller section 3 reads data out of a programmable read-only memory (P-ROM) 6. The operation of the controller section 3 will be now described in detail.

The display section 4 includes a liquid crystal display (LCD) for a plurality of alpha-numeric characters each composed of 7 segments. The amplifier section 5 amplifies the alert tone sent from the controller section 3 up to the level sufficient to drive a speaker 7. A P-ROM 6 stores identification numbers of the receiver and commands designating functions to the receiver (for instance, an automatic reset function, or a battery saving function). The speaker 7 which is driven by the amplifier 5, informs the bearer of a call by transducing the alert tone to an audible signal. The power supply controller section 8 controls the connection and disconnection of a battery 10 to the radio section 2, in accordance with the battery saving timing signals from the controller section 3. A crystal resonator 9 generates clock signals which are provided to the controller section 3. The reference numeral 11 denotes a reset switch whose function will be described later.

The receiving operation of the receiver will now be described briefly. A carrier wave is picked up by the antenna 1, subjected to frequency conversion, amplification, demodulation and waveform-shaping in the radio receiving section 2 and applied to the controller section 3 in the form of digital signal. The controller section 3 compares the demodulated digital signal with its own ID number which has been stored in the P-ROM 6 beforehand to check whether or not the receiver is paged. If the controller section 3 confirms the page, it supplies an alert tone to the amplifier section 5 to drive the speaker 7. A display information included in the page signal is displayed on the display section 4. The display is controlled by the controller section 3 to erase those numbers on display about 8 second later, for example.

Figure 2:
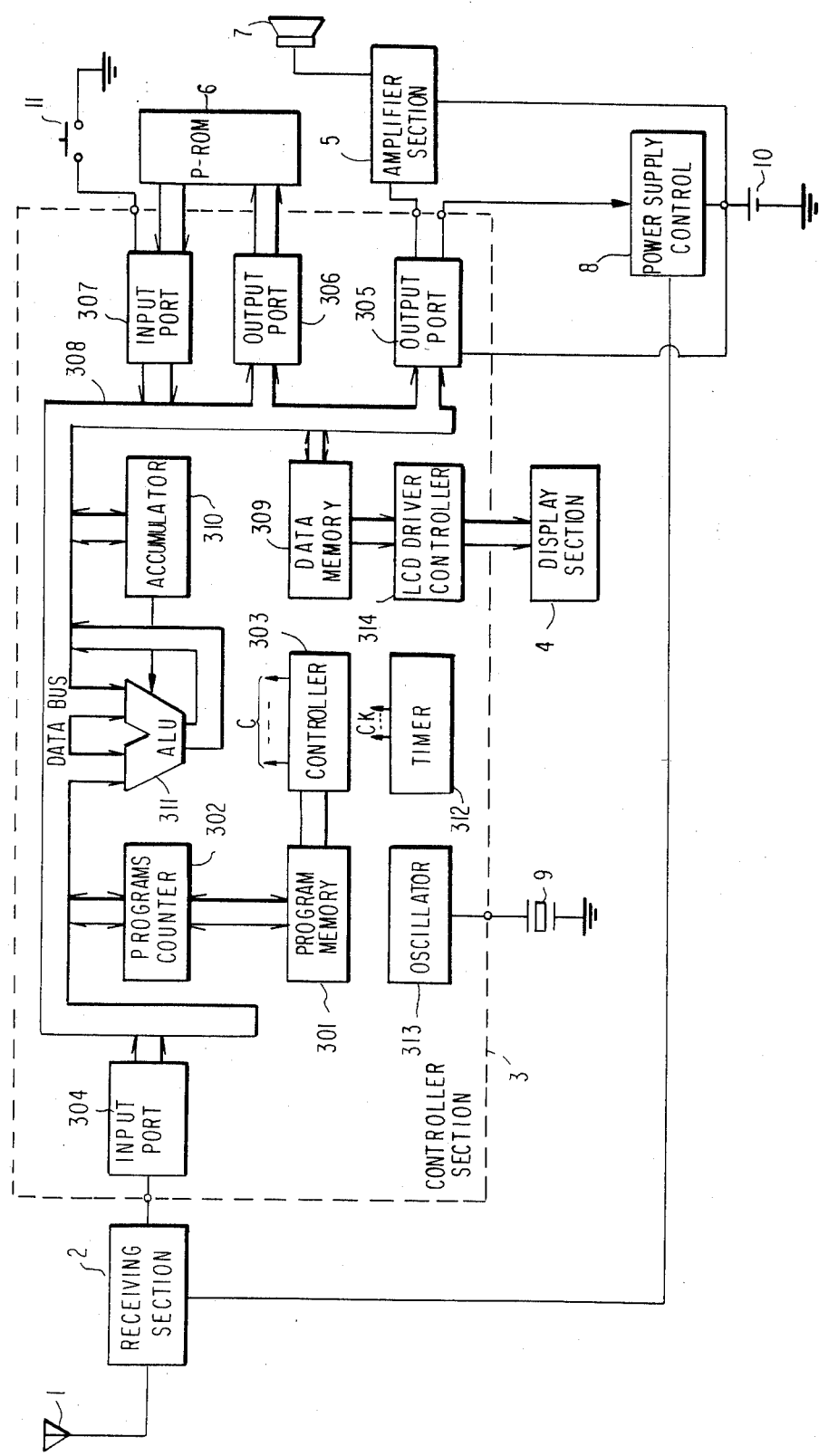
FIG. 2 is a detail block diagram of a controller section of the receiver shown in FIG. 1.

Referring now to FIG. 2, the basic function and operation of the controller section 3 will be described below. The controller section is a central processing unit (CPU) of the single-chip structure and may be, for instance, a μPD-7502 or μPD75-3 manufactured and marketed by NEC Corporation. The program memory 301 contains sequences of instructions for the controller. The instructions for test modes, which features the present invention, are also written therein (which will be described in more detail later).

The program memory 301 which is addressed by a program counter 302, supplies its contents to a controller 303 which in turn outputs control signals C to respective sections in accordance with the contents. The program counter 302 usually increments everytime the program memory 301 is output to the control section 303. The interface between the exterior circuits and a data bus 308 is composed of a reception input port 304, an activation outport port 305, a memory output port 306 and a control input port 307. The data bus 308 is also coupled to the program counter 302, a data memory 309, an accumulator 310 and an arithmetic and logic unit (ALU) 311 for transmitting data.

A synchronizing clock signal CD according to which input data can be written into the controller section 3, is generated by the crystal resonator 9, an oscillator 313 and a timer 312. The display data stored temporarily in the data memory 309 is fed to the LCD or display section 4 via an LCD controller/driver 314 for display.

Figure 3:
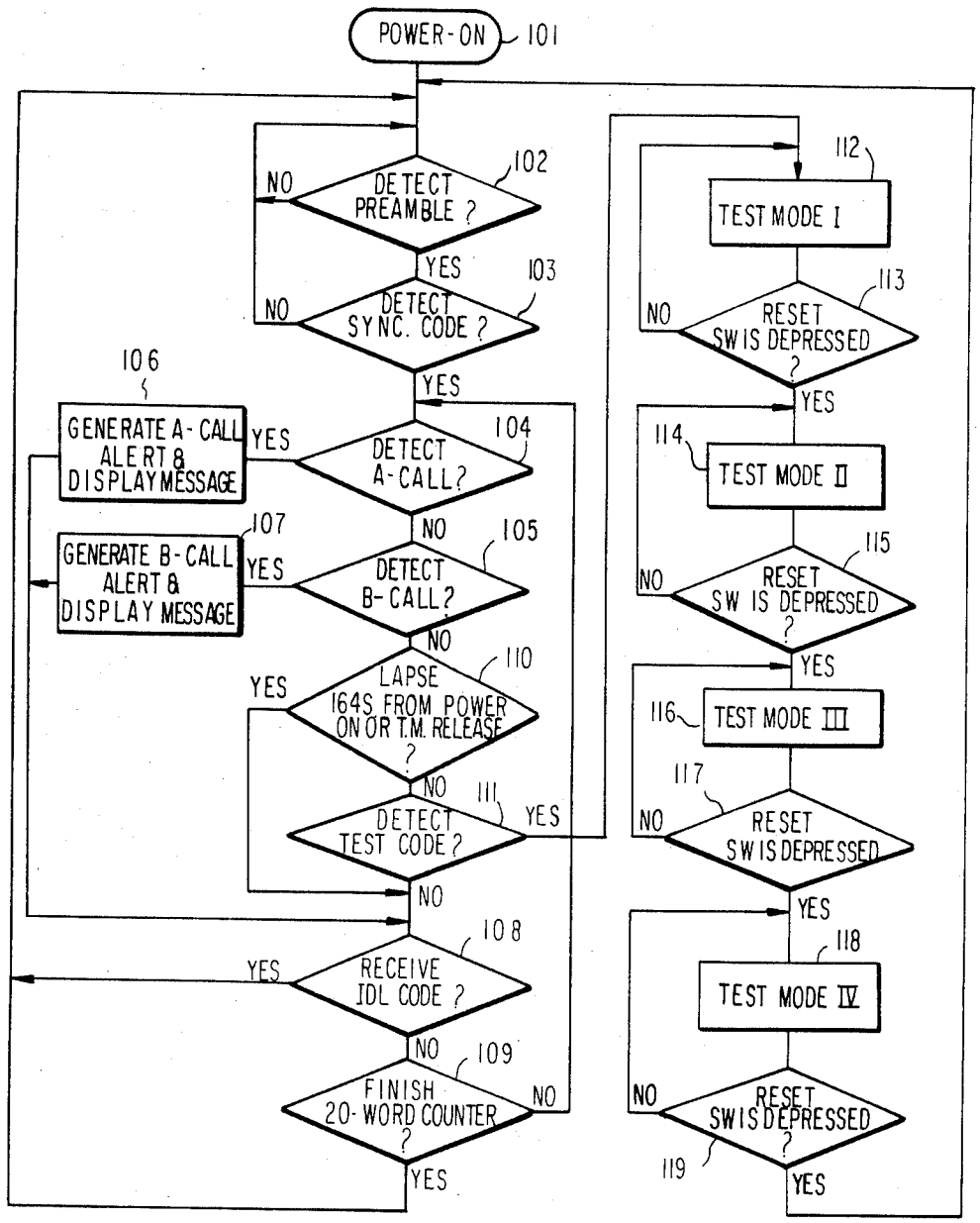
FIG. 3 is a flow chart to explain the operation of the receiver shown in FIGS. 1 and 2.

The corresponding step in the sequence in the flow chart of FIG. 3 is expressed by numerals in parentheses at the end of each step of the following description.

The normal flow, when a page call is received, will be first explained below. When connected to the battery, the receiving section is actuated to detect a preamble signal which the transmitting side transmits ahead of the ID signal. When the preamble signal is received, the controller section proceeds to detection of synchronization code (SC) signal (Steps 101, 102). When the SC signal is detected, the receiver proceeds to the reception of the ID number signal, in this example, two page number signals which will be called an A call and a B call (Step 103).

When either an A call or a B call is detected, the controller section 3 generates an alert tone corresponding to each call. If a display message is appended to those calls, the controller section 3 displays them on the LCD display section 4 (steps 104 to 107). If neither an A call nor a B call is detected and the 164 second period has not yet lapsed, the received signal is checked as to whether or not it is a test code (steps 104, 105, 110 and 111). If no test code is detected and an idle code is received, the controller section 3 returns to step 102 for checking the reception of the preamble signal (steps 111 and 108).

When the idle code is not received at step 108, the controller section 3 repeats the search for the A call, B call, test call or idle code until a 20-word counter finishes, i.e., until the transmission of one group of 20 words finishes. If the 20-word counter has finished at step 109, the controller section 3 also returns to step 102.

The flow of operation which sets the receiver in the test modes in order to conduct various tests on the receiver will now be explained. If the test code is detected at step 111, the receiver proceeds to a test mode I (steps 111 and 112).

However, if no test code is received within 164 seconds from the turning on of the receiver, the receiver is inhibited from receiving test codes after 164 seconds from the turning-on of power. This is because if the receiver misinterprets a normal call sent from the base station as the test code in practical use, the receiver will be shifted to the test mode thereafter and will not be able to conduct normal paging operation.

As shown in the steps 112 through 119 of the flow chart in FIG. 3, there are four types of test mode according to the present invention, each of which is used for a series of tests for the receiver.

Test mode I (Step 112): Immediately after receiving a test code, the receiver enters this mode and "E1-" display will appear at the display device 4 in FIG. 1. In this mode, the receiving section 2 (FIG. 1) is forced to be connected with the battery, thereby suspending the battery saving function. It becomes, therefore, possible to adjust the receiving section and measure the characteristics thereof. It is continuously checked whether or not the battery voltage is at a normal level. When the battery voltage drops to an abnormal level, the controller section 3 generates as alarm tone. When the battery voltage is restored to the normal level, the controller section 3 automatically stops the alarm tone. It is therefore quite simple to measure a voltage at which the alarm tone is generated.

Test mode II (Step 114): When the reset switch 11 (FIG. 1) is pushed down during the test mode I, the receiver will enter the test mode II and the display of "E2-" will appear on the display 4 (Step 113).

In the mode II the receiving sensitivity can be measured by receiving a test code which a test encoder generates. The test encoder is usually located nearby the receiver to be tested. When the test code is received, an alert tone starts to be generated but this alert tone is automatically stopped 0.32 seconds, for example, after its start. If the receiver is measured for its sensitivity in this mode, the measurement of the sensitivity can be carried out simply in a shorter time because one call takes about 2 seconds and there is no need to manually stop the alert tone. Since the test code is common for all the paging receivers, there is no necessity to change the call number of the test encoder for each one of the receivers.

Test mode III (Step; 116): By pressing the reset switch 11 during the test mode II, the receiver can be made to enter the mode III and "E3 XXXXXX XX" will appear on the display 4 (Step 115). This display will be described in detail. Its first 6 digits denote the A call number and the last 2 digits denote the function of the receiver. By reading the display, the user can see the content of the ROM 6. In this mode III, the power supply from the battery is forced to be cut off from the receiving section 2 to save the battery.

Test mode IV (Step 118): By pressing the reset switch 11 during the test mode III, the receiver can be made to shift to the mode IV and the display of "E4-XXXXXX XX" will appear on the display 4 (Step 117). Similarly to the mode III, the first 6 digits of the display denote the B call number while the last two digits the function of the receiver. Similarly to the previous test mode III, in this test mode, the content of the ROM 6 can be confirmed by checking the display. The power supply is cut off from the receiving section in this case, too. By pressing the reset switch during the test mode IV, the test mode is released (Step 119). If a test code is received within 164 seconds after the release, the receiver enters the test mode again.

"E-1", which is continuously displayed during the test mode I, prompts the user to press down the reset switch 11 in order to shift the receiver into the test mode II. Similarly, "E2-", "E3 XXXXXX XX" and E4 XXXXXX XX" urge the user to press down the reset switch so that the receiver is transferred to another test mode or a normal page-receiving mode. Furthermore, if no test code is received within 164 seconds either from the turning-on or from the release from the test mode, the receiver never enters into any test mode. Accordingly, incoming pages are never missed. In addition, since the battery saving function is turned on during the test modes III and IV, the power consumption of the present receiver can be improved, compared with the conventional receiver.

The test code will now be described. As mentioned above, since the test code which shifts the receiver into the test mode is a page call number common to all the receivers, the format thereof is the same as that of normal page call number. The only difference from the normal call number is that all the receivers share a common number.

In this example, a code of "1,009,268 (decimal)" having a well balanced mix of binary ones and zeroes and a number larger than one million which will never be used as a page call number is used. If expressed in binary form, it will be $_{MSB}01111011001100111010010101001000_{LSB}$. MSB denotes the most significant bit and LSB the least significant bit.

The string of calling signals sent from the test encoder for the use in the present invention will be described referring to FIGS. 4A to 4D. The symbols in the drawings PS denotes a preamble signal, SC a synchronization code, SUB a calling number for subscribers, IDL an idle signal and TEST a test code. Reference should be made to "A Standard Code for Radiopaging", July, 1979 proposed by the British Post Office for a basic explanation of the signal format.

Figure 4A:
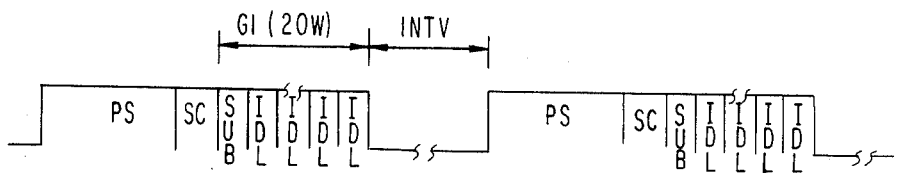
FIGS. 4A through 4D are the diagrams to show various code signals which are received by the receiver shown in FIGS. 1 and 2.

FIG. 4A shows a calling signal format when a receiver having a call number which belongs to the Group G1 is being tested for calling. The preamble signal PS and the 20-word group G1 codes are repeatedly transmitted at a predetermined interval (INTV). In this case, the transmitted test group is added only to the group G1 signal and the length of a frame is (preamble+SC+one group) and therefore lasts about 2 seconds. The calling test can, therefore, be conducted in a relatively short time.

Figure 4B:
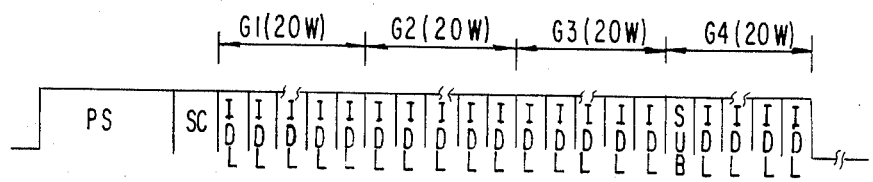

FIG. 4B shows a conventional calling signal format when a receiver having a call number belonging to Group 4 is being tested. In this case, the transmitted test group is added to groups G1 to G4 and the length of a frame is (preamble+SC+4 groups), thereby taking a fairly long time (about 16 seconds). As mentioned in the foregoing, this forms a defect in the prior art.

Figure 4C:
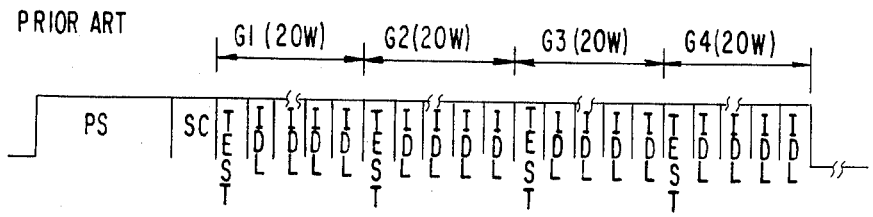

FIG. 4C shows a calling signal form for shifting the receiver, which belongs to the Group 4, to the test mode. The test code, TEST, is inserted at the first word in every group in order to shift all the receivers belonging to groups G1 to G4 to the test mode. The signal format shown in FIG. 4C is used when the receiver is shifted into the test mode I. Since the common test code is used for all receivers belonging to groups 1 to 4, the setting of the test encoder is very simplified.

Figure 4D:
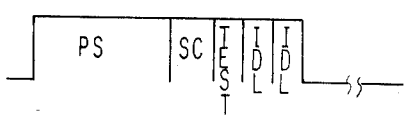

FIG. 4D shows a calling signal format which is used for a simplified calling test in the test mode II. All the paging receivers which have been shifted to the test mode II can be tested for their receiving sensitivity by receiving the test code included in the signal format shown in FIG. 4D. Since it takes only about 2 seconds for generating the signal format shown in FIG. 4D, the measuring of the receiving sensitivity can be done in an extremely short time. A receiver which has been brought to test mode II in response to the test code shown in FIG. 4C actuating the reset switch, can be subjected to the calling test by supplying the signal shown in FIG. 4D, regardless of the group to which the receiver belongs.

Figure 5A:
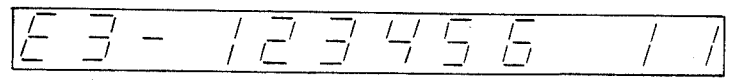
FIGS. 5A and 5B show examples of the display on the display section at the test mode of the receiver according to the present invention.
Figure 5B:
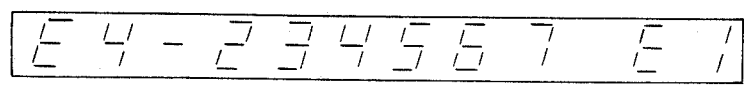

FIGS. 5A and 5B are the views to show the content of the ROM 6 in FIG. 1 displayed on the display 4. FIG. 5A shows an example of such display at the time of Mode III and the first digits "123456" denotes the A call number. The two subsequent digits F1 and F2 denote the functions of the receiver and as shown in the FIGS. 5A and 5B, display numerical figures of 0 to 3 and 1 to 3. The content thereof is programmed as shown in Table I below. According to Table I, the last two numerical references "11" in FIG. 5A, for example, indicate that the paging receiver has a vibrator function, a battery saving function as well as an automatic reset function for the battery saving operation.

TABLE I

| F1 | Functions | | F2 | Function |
|---|---|---|---|---|
| 0 | Battery Saving (BS) | — | — | |
| 1 | Battery Saving (BS) | BS Automatic Reset | 1 | Vibrator |
| 2 | — | — | 2 | Memory |
| 3 | — | BS Automatic Reset | 3 | Muting |

FIG. 5B shows an example of the display at the test mode IV wherein the first "234567" denotes the B call number. The subsequent two digits F1 and F2 are a group number and a synchronization code (SC), respectively. The content thereof is programmed as shown in Table II. According to Table II, the F1 and F2 of "31" in FIG. 5B, for example, denote that the pager belongs to the group G1 and the synchronization code number 2 and has a repeat call function. The repeat call function means that when a repeat call is sent out and the pager receives it, the pager receiver inhibits the repeat call from being written in the data memory.

TABLE II

| F1 | Group Number | F2 | Function |
|---|---|---|---|
| 0 | 4 | 0 | Repeat Call |
| 1 | 3 | 1 | Repeat Call |
| 2 | 2 | 2 | Repeat Call |
| 3 | 1 | 3 | — |

As described in detail in the foregoing, according to the present invention, a portable receiver can be monitored for various adjustments and testing operations by inputting only one test code and by manipulation of a reset switch. Further, a calling test can be conducted for measuring characteristics of the receiver with one common call number and a short code, thereby conveniently minimizing the time required for measurement.

What is claimed is:

1. A paging receiver comprising:
   receiving section means for receiving a carrier wave modulated with a calling signal including a first signal sequence and either a second or a third signal sequence which follows said first signal sequence;
   power supply control means for supplying power to said receiving section means when said power supply control means receives a first control signal;
   controller section means for supplying said first control signal to said power supply control means for only a first predetermined time period when said controller section means detects said first signal sequence so that said controller section means can detect said second or third signal sequence, supplying said first control signal to said power supply control means in order to shift said receiver to a first test mode when said third signal sequence is detected, shifting said receiver from said first test mode to a final test mode when said controller section means receives a second control signal, reshifting said receiver from said final test mode to normal operation when said controller section means detects a third control signal and inhibiting said receiver from shifting to said first test mode if said third signal sequence is not received within a second predetermined time period either from the turning-on of said receiver or from the reshifting of said receiver to normal operation; and
   switch means connected to said controller section means for generating said second and third control signals.

2. A paging receiver as claimed in claim 1, further comprising:
   means for storing a calling code assigned to said receiver; and
   annunciator means for generating an audible tone when said annunciator means receives an alarm signal; and
   wherein said controller section means includes means to shift said receiver from said first test mode to a second and a third test mode, respectively, before said receiver shifts to said final test mode when said controller section means receives a fourth and a fifth control signal, to shift said receiver from said third test mode to said final test mode when said controller section means receives said second control signal, to supply said alarm signal to said annunciator means when said controller section means detects said second or third signal sequence during said second test mode, to supply said display means with said calling code stored in said memory means and a coded data indicative of the functions of said receiver during said third and final test modes and to suspend the supply of said first control signal to said receiving section means during said third and final test modes; and
   wherein said switch means includes means to generate said fourth and fifth control signals.

3. A paging receiver as claimed in claim 2 wherein said controller section means includes a programmed microcomputer to execute the steps of:
   (a) detecting said first signal sequence;
   (b) detecting said second signal sequence to generate said alarm signal;
   (c) detecting said third signal sequence to shift said receiver to said first test mode;
   (d) shifting said receiver to said second, third and final test modes respectively when said controller section means receives said fourth, fifth and second control signals;
   (e) inhibiting the supply of said first control signal to said power supply control means during said third and final test modes;
   (f) restoring said receiver from said final test mode to normal operation when said controller section means receives said third control signal; and
   (g) inhibiting said receiver from shifting to said first test mode if said third signal sequence is not received within said second predetermined period from a time at which either the power of said receiver is turned on or said receiver is stored to said normal operation.

4. A paging receiver as claimed in claim 2 wherein said third signal sequence is identical to said second signal sequence during said second test mode.

5. A paging receiver as claimed in claim 3 wherein said calling signal contains a plurality of said second signal sequences which are divided into a plurality of groups and said third signal sequence is allotted to the beginning of said plurality of groups.

6. A test method for a receiver with battery saving function, said method comprising the steps of:
   (a) suspending said battery saving function and shifting said receiver to a first test mode when said receiver receives a test code;
   (b) shifting said receiver from said first test mode to a final test mode by means of a switch incorporated in said receiver;
   (c) reshifting said receiver from said final test mode to the normal operation means of said switch; and
   (d) inhibiting said receiver from shifting to said first and other plurality of test modes if said test code is not received within a predetermined period of time either from the turning-on of said receiver or from the shifting to said normal operation.

7. A method as claimed in claim 6 further including the steps of:
   (e) serially shifting said receiver from said first test mode to a second and third test mode respectively, by means of said switch before said receiver shifts to said final test mode;

(f) conducting the test of a receiving section of said receiver during said first test mode;

(g) conducting the test of the receiving sensitivity of said receiver and of a display device of said receiver and confirming the functions of said receiver and the memory content of a memory section of said receiver during said second, third and final test modes; and (h) restoring said battery saving function during the time of the test of said display device or of checking of said receiver functions and the memory content of said memory section.

* * * * *